(12) United States Patent
Orenbuch

(10) Patent No.: US 8,028,775 B2
(45) Date of Patent: Oct. 4, 2011

(54) SPHERICAL MOBILITY MECHANISM

(76) Inventor: Shmuel Orenbuch, Kfar Azar (IL)

( * ) Notice: Subject to any disclaimer, the term of this patent is extended or adjusted under 35 U.S.C. 154(b) by 566 days.

(21) Appl. No.: 10/520,381

(22) PCT Filed: Mar. 6, 2003

(86) PCT No.: PCT/IB03/01518
§ 371 (c)(1),
(2), (4) Date: May 25, 2006

(87) PCT Pub. No.: WO03/074869
PCT Pub. Date: Sep. 12, 2003

(65) Prior Publication Data
US 2006/0243497 A1   Nov. 2, 2006

Related U.S. Application Data

(60) Provisional application No. 60/362,164, filed on Mar. 6, 2002.

(51) Int. Cl.
*B60K 17/30* (2006.01)
(52) U.S. Cl. .................. 180/6.2; 180/7.1; 180/252
(58) Field of Classification Search .............. 180/6.2, 180/252, 7.1
See application file for complete search history.

(56) References Cited

U.S. PATENT DOCUMENTS 6,340,065 B1 * 1/2002 Harris ................ 180/7.2
6,830,114 B2 * 12/2004 Hammonds ............ 180/6.2

FOREIGN PATENT DOCUMENTS

| JP | 362203824 A | | 2/1986 |
| JP | 62203824 A | * | 9/1987 |
| JP | 362203824 A | * | 9/1987 |
| JP | 02001354156 A | | 6/2000 |
| JP | 2001354156 | * | 12/2001 |
| JP | 2001354156 A | * | 12/2001 |
| WO | WO 98/31583 | * | 7/1998 |
| WO | WO9831583 | | 7/1998 |

OTHER PUBLICATIONS

Salkever, A., The Mind-Spinning Potential of the Spherical Motor, The device's remarkable flexibility could serve myriad purposes, from NASA engineering to marking medical equipment, BW Online, Jan. 18, 2001.

* cited by examiner

*Primary Examiner* — Anne Marie Boehler
*Assistant Examiner* — Michael Stabley
(74) *Attorney, Agent, or Firm* — Kohn & Associates, PLLC

(57) ABSTRACT

An omni directional mobility device made of a spherical device that is capable of omni directional movement. An omni directional vehicle including a vehicle and at least one omni directional mobility device made of a spherical device for enabling omni directional movement.

17 Claims, 2 Drawing Sheets

SPHERICAL MOBILITY MECHANISM

CROSS-REFERENCE TO RELATED APPLICATIONS

This patent application is a National Phase filing of PCT/US2003/001518, filed Mar. 6, 2003, which claims the benefit of priority of U.S. Provisional Patent Application Ser. No. 60/362,164, filed Mar. 6, 2002, both of which are incorporated herein by reference.

BACKGROUND OF THE INVENTION

1. Field of the Invention

The present invention relates to a mechanism utilized for movement on a support surface.

2. Description of the Related Art

There have been known heretofore a variety of different mechanisms used to provide support and directional movement of different types of vehicles or other structures. These mechanisms include, but are not limited to, wheels, swivel casters, swivel wheels, belts, rail tracks, treads, and the like. Depending upon the setting in which they are utilized, these mechanisms vary in shape, dimensions, complexity, and design. Moreover, these types of mechanisms are used in various vehicles that include, but are not limited to, motor vehicles, automobiles, carts, wheelchairs, chairs, recreational vehicles, trailers, and any other similar transportation units known to those of skill in the art.

A ubiquitous mechanism used for a motor vehicle is a wheel. Currently, wheels provide the most common mechanism in which to support, control, and move a motor vehicle. Wheels are coupled to a separate drive axis that provides power for movement of the vehicle thereof. Additionally, wheels are usually coupled together so that they are controlled simultaneously in unison. Although wheels have been used for over a century, they have several drawbacks. For instance, currently existing wheels do not provide a wide range of movement possibilities. While, wheels provide for an efficient and effective mechanism for driving the vehicle in a relatively straightforward and backward direction, complete lateral or horizontal movement cannot be accomplished.

Accordingly, there is a need for a mobility mechanism that provides increased lateral and horizontal movement and increased directional mobility of vehicles. Additionally, there is a need for a drive and steering mechanism that is used in conjunction with the mobility mechanism.

SUMMARY OF THE INVENTION

According to the present invention, there is provided an omni directional mobility device, the device includes a spherical mobility mechanism for enabling omni directional movement. Also provided is an omni directional vehicle including a body and at least one omni directional mobility device including a spherical mobility mechanism for enabling omni directional movement.

BRIEF DESCRIPTION OF THE FIGURES

Other advantages of the present invention will be readily appreciated as the same becomes better understood by reference to the following detailed description when consider in connection with the accompanying drawings wherein.

DETAILED DESCRIPTION OF THE INVENTION

The present invention provides a spherical mobility mechanism, generally indicated at 10 in the Figures, which can be used in a variety of vehicles for providing support and omni directional movement of the vehicles. The spherical mobility mechanism 10 is capable of combined, simultaneous horizontal and lateral movement of the vehicle to which it is operatively connected. In other words, from any given point, the spherical mobility mechanism 10 allows for movement in any direction.

The spherical mobility mechanism 10 of the present invention is typically operatively connected to a vehicle, generally shown at 30. The spherical mobility mechanism 10 gives support and increased directional mobility on a surface on which the vehicle is placed. The present invention further provides for a vehicle that includes a spherical mobility mechanism 10. Additionally, there is provided a spherical mobility mechanism 10, a drive mechanism 15, and a steering mechanism either alone or in combination with each other thereof.

The term "sphere" and "ball" as used herein are meant to include, but are not limited to, a globe or a solid that is bound by a surface consisting of an infinite number of points located at a given distance from a point constituting its center. It can be solid or hollow. It can also be rigid or flexible. If flexible, the vehicle 30 may flatten the surface of the sphere mobility mechanism 10 contacting a surface, such as a roadway. However, preferably the remainder of the sphere 10 remains spherical.

Figure 1:
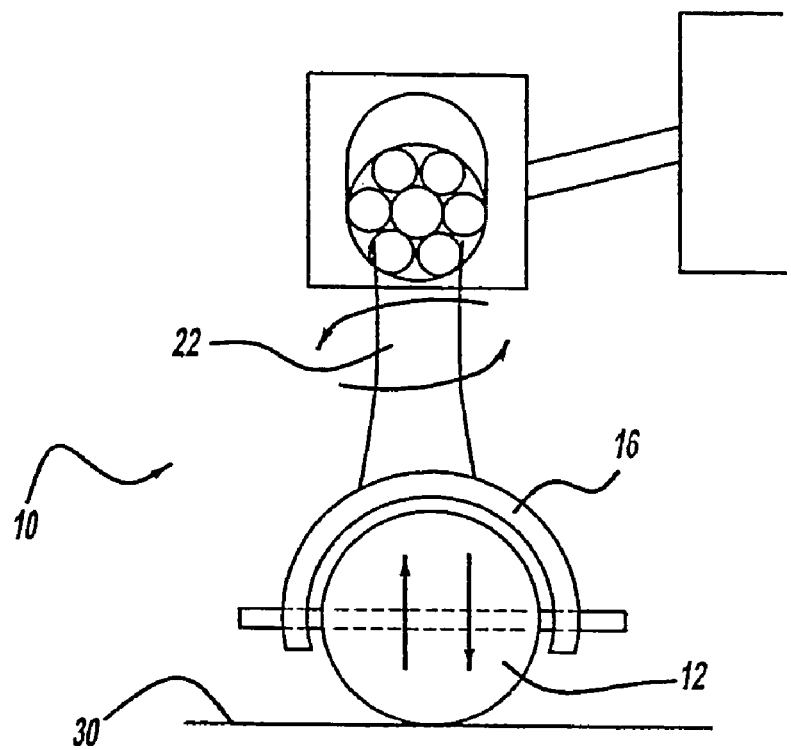
FIG. 1 is a side view, partially cut away, of an embodiment of the present invention wherein the spherical mobility mechanism is rotatable about an internal and an external axis.
Figure 2:
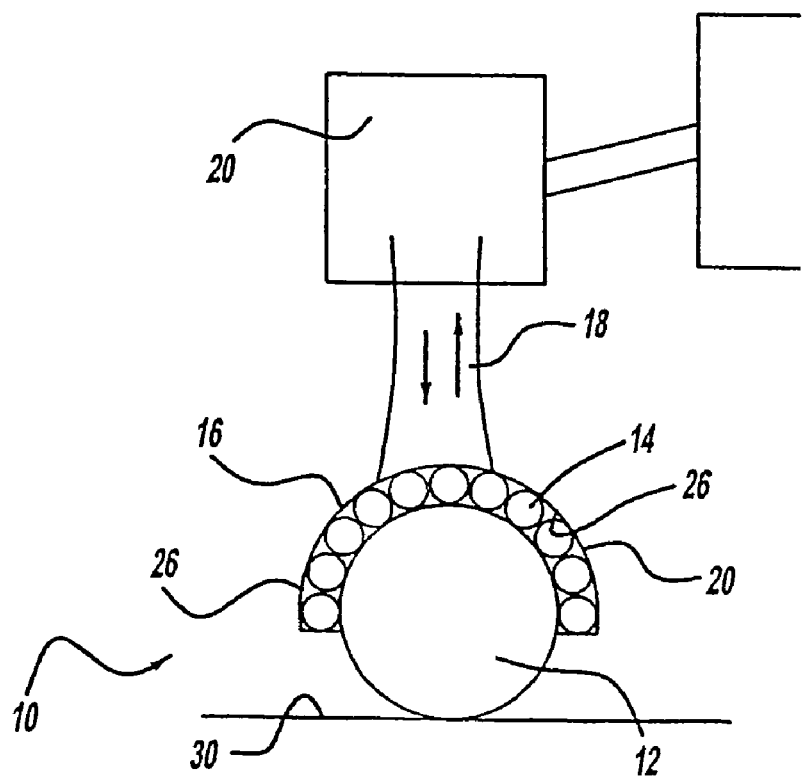
FIG. 2 is a side view, partially cut away, of an embodiment of the present invention wherein the spherical mobility mechanism is encased within a semi-spherical cap.

The present invention, generally shown in FIGS. 1 and 2 and indicated at 10 therein, includes a sphere 12 that has a varying diameter depending upon the design and setting of usage of the present invention. The sphere 12 is adapted to be in frictional rolling engagement with a support surface 30 upon which the vehicle is placed. The sphere 12 can be composed of numerous materials that are suitable for use under the appropriate conditions. These materials include, but are not limited to, synthetic material, metal, stainless steel, rubber, plastic, glass, ceramics, and any other suitable materials known to those of skill in the art. The sphere 12 can also be made of various combinations of the above materials and/or other alloys known to those of skill in the art. Additionally, the sphere 12 can be coated with a synthetic material such as a resin to provide protection against wear of the sphere 12 and/or to provide an increased frictional surface that can better grip the support surface 30. Examples of such resins are well known to those of skill in the art.

The sphere 12 of the spherical mobility mechanism 10 provides not only selective translational movement, such as forward and rearward directions, but also selective turning movement in the lateral or horizontal directions (left or right). The sphere 12 can be either active or passive, wherein an active sphere 12 is operatively engaged to an actuating device 13 and a passive sphere 12 is merely supported from the vehicle for omni directional movement.

The active sphere 12 provides directional movement and active driving locomotion through the actuating device 13.

The actuating device 13 includes a controlled drive mechanism 15 that directly engages and contacts the sphere 12. The controlled drive mechanism 15 provides sufficient frictional engagement with the sphere 12 such that the sphere 12 moves in a desired direction. Examples of such a drive mechanism 15 includes, but is not limited to, a drive belt, ball bearings, spherical driving mechanisms, wheels, and any other similar device that provides enough frictional engagement contact to roll or move the sphere in any particular direction. The controlled drive mechanism 15 is further engaged to a drive shaft 17 and a motor, which provides the driving force behind the controlled drive mechanism 15. Various drive shafts with or without gears can be used and are well known to those of skill in the art.

Preferably, a motor 32 is used to operate the drive mechanism 15. The motor can be an electric or combustion motor. Preferably, the motor 32 includes speed reduction gears thus enabling a reduced output speed to be produced for causing the vehicle to move at a desired terminal velocity when the motor is fully energized. Examples of such motors are also well known to those of skill in the art. The motor can be pivotally interconnected to the controlled drive mechanism 15 by the drive shaft 17. Alternatively, an extension of the controlled drive mechanism 15 that includes a drive roller affixed to the shaft can be utilized for contacting the surface of the sphere 12 such that the extension imparts a rotational force to the surface of the sphere 12 perpendicular to a place that vertically bisects the sphere and which plane intersects the point of contact of the sphere 12 by the controlled drive mechanism 15. Thus, depending upon the direction of rotation of the controlled drive mechanism 15, the sphere 12 can be caused to rotate in any direction.

In yet another embodiment, as shown in FIG. 2, the controlled drive mechanisms 15 are ball bearings wherein control is provided by the motor that is preferably mounted to a plate such that it imparts rotational force in any direction to produce rotation for forward or rearward movement, while at the same time not precluding rotation of the sphere. The rotation causes a turning movement of the vehicle with respect to the sphere 12 and the sphere 12 then rotates about a vertical pivot axis if the motor is not energized, causing the vehicle to veer to the left or right if the vehicle is being driven translationally either forward or rearward by the motor.

Figure 3:
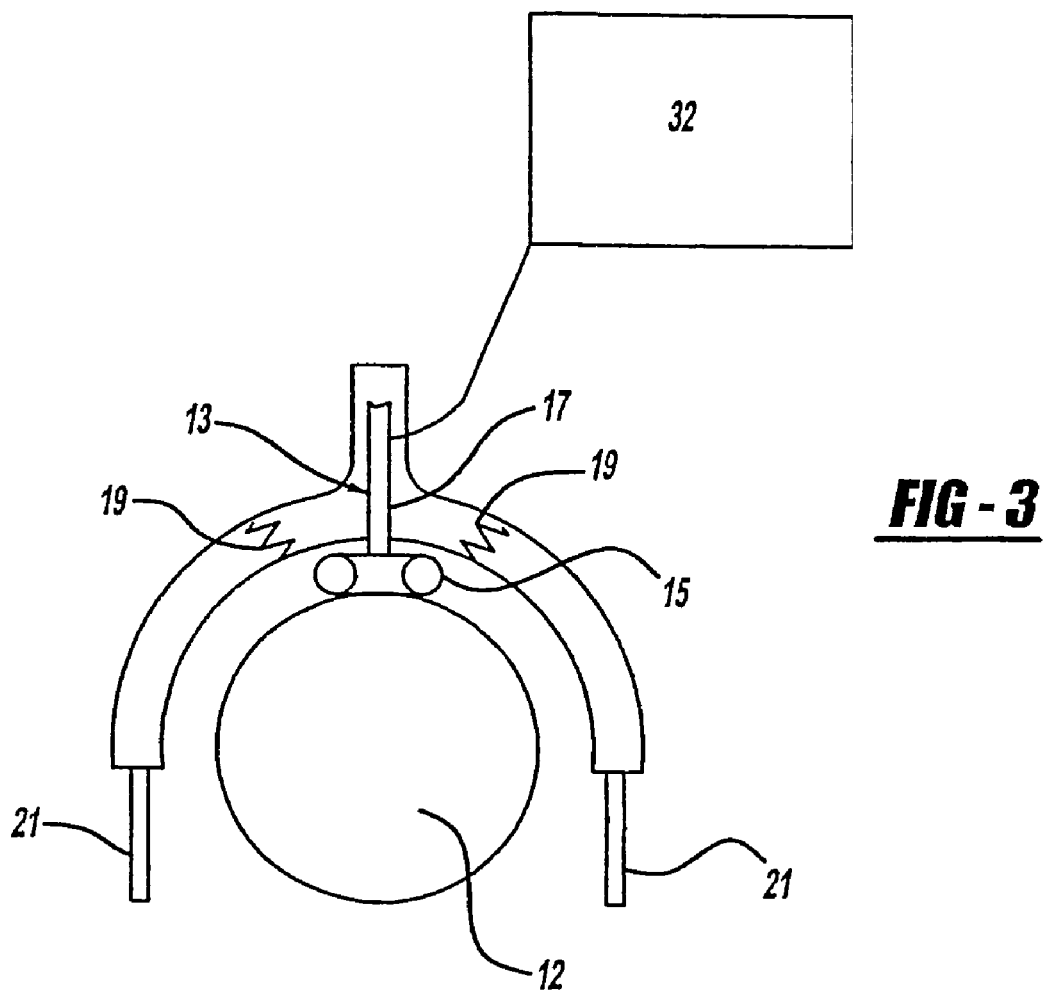
FIG. 3 is a side view, partially cut away, of an embodiment of the present invention wherein the spherical mobility mechanism is operatively engaged to an actuating device.
Figure 4:
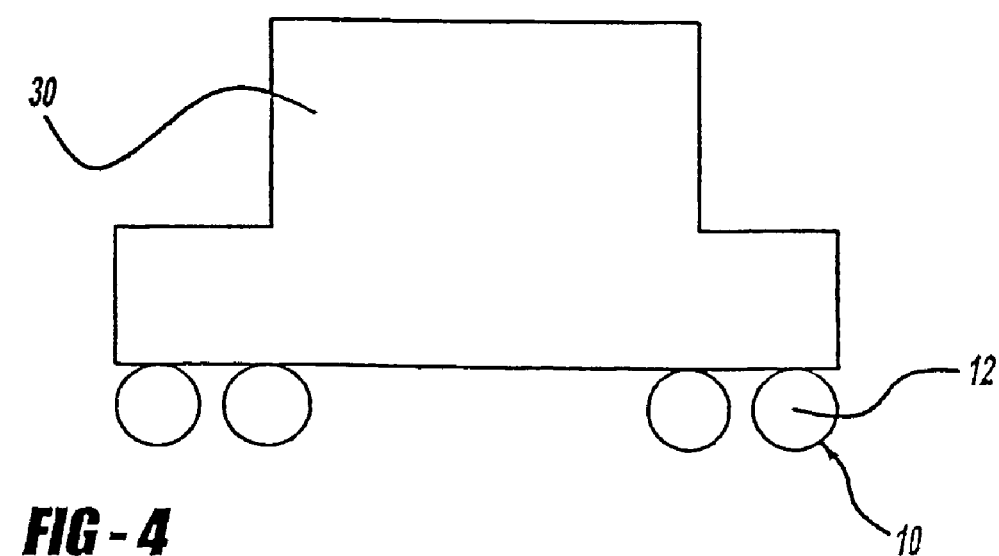
FIG. 4 is a side view of a vehicle having the spherical mobility mechanisms of the present invention.

The entire actuating mechanism 13 is controlled electronically or mechanically depending upon the desired design (See FIG. 3). For instance, control of the actuating device 13 can be provided by forward and reverse movement control switches such as a micro-switch or snap action type switches having operating levers including roller contacts. Optionally, the actuating mechanism 13 can be controlled/steered via a computer. A computer-dependent system enables optimal steering. Springs 19 can be utilized to provide additional shock absorbing support and balance of the vehicle thereof. Additionally, casters 21 can be placed on the vehicle near the spheres to provide additional support and guidance. Of course, the springs 19 and casters 21 can also be utilized with a passive sphere 12.

A passive sphere is operatively engaged to any type of rolling support 14 that aids the sphere 12 in rolling or moving in a particular, desired direction. The rolling support 14 provides support to the sphere 12 and aids in the turning or rolling ability of the sphere 12. The rolling support 14 includes, but is not limited to, ball bearings, rollers, treads, wheels, and the like. Additionally, the rolling support 14 can be controlled with a steering device. There are numerous steering devices known to those of skill in the art.

In addition to being-either active or passive, the spherical mobility mechanism 10 can move independently or coupled with other spherical mobility mechanisms 10. If the spherical mobility mechanisms 10 are coupled together, then they can move in unison upon being controlled by a steering device.

In another embodiment, shown in FIG. 3, the sphere 12 is situated within an encircling cap 16 that is supported by an arm 18 and operatively connected to an upper inside base 20 of a cap by a vertical axis 22. The arm 18 includes two axles—one external axle 22 and one internal 24. The internal axle 24 operates the movement of the sphere 12 (i.e., forward and backward movement), whereas the external axle 22 is connected to gear teeth enabling circular movement of the entire axle 22 either in a clockwise or counter-clockwise direction. The movement in each of the spheres 12 produces an innovative movement combination to fulfill the various functions described herein.

In another embodiment, shown in FIG. 2, the sphere 12 is situated within a semi-encircling cap 16, whose sides 26 are lined with rolling supports 14 such as ball bearings 14. The ball bearings 14 are operatively engaged to the sphere 12 to provide active or passive movement of the sphere 12. The ball bearings 14 can simply provide turning movement of the sphere 12. Alternatively, the ball bearings 14 are in contact with the sphere 12 so that rolling movement in a counter-clockwise, clockwise, forward, backward, horizontal, and lateral direction can occur.

In the several embodiments, steering is perfected-through enabled steering combinations in conjunction with the sphere's 12 angles and motion based on the principle of particular sphere 12 movements to provide every angle according to situational variables (i.e., surface, velocity, stability angle, tension, etc.). Further, in any of the embodiments described herein, the spherical mobility mechanisms 10 can be used in connection with other existing vehicle mechanisms including, but not limited to, braking systems, anti-braking systems, anti-sliding mechanisms, all-wheel drive mechanisms and systems, and the like. As stated above, preferably, the steering is accomplished via a computer-dependent system, this steering is therefore optimal because it can respond rapidly to movements of the sphere 12.

The present invention has numerous advantages over the prior art including, but not limited to, providing increased lateral or horizontal movement along a surface, decreasing the occurrence of slippage that can result with traditional moving mechanisms (this occurs due to the function of centrifugal and centripetal pressures), increasing control over directional movement, and increasing control over gliding functions.

The present invention can be utilized by numerous vehicles that include, but are not limited to, motor operated vehicles, bicycles, wheelchairs, recreational vehicles, forklifts, electrical transportation units, automobiles, carts, wheelchairs, chairs, trailers, and any other similar transportation units known to those of skill in the art. The spherical mobility mechanism can be used in isolation or in multiple combinations thereof. For example, a total of four spherical mobility mechanisms can be used on a motor operated vehicle or three could be used in a pushcart. Further, the spherical mobility mechanism can be independently controlled and driven in isolation with other spherical mobility mechanisms located on the vehicle therein or more than one spherical mobility mechanism can be coupled together and operate in unison with each other. Alternatively, the spherical mobility mechanism can be used in combination with currently existing tires, wheels, treads, and other driving wheels or devices. Thus, the present invention can serve as a replacement for vehicle tires.

The present invention provides results that solve long standing problems. For example, people confined to wheelchairs have has to totally remodel their homes to allow for wide-angle turns. This problem is obviated by the present invention. The present invention, if used on all supports of a wheelchair, allows for turning on a point. Even if used on two points, the angle of the turn is greatly reduced. The same advantage is seen with other vehicles, such as forklifts, where space for storage is to be maximized and space for turning is best minimized.

The present invention has been described in an illustrative manner, and it is to be understood that the terminology that has been used is intended to the nature of words of description rather than of limitation.

Obviously, many modifications and variations of the present invention are possible in light of the above teachings. It is, therefore, to be understood that within the scope of the described invention, the invention can be practiced otherwise than as specifically described herein.

What is claimed is:

1. An omni directional mobility device, said device comprising a cap structure, an active drive sphere operatively situated within said cap structure for actively enabling omni directional movement and active ball bearings directly engaging said sphere providing frictional engagement to drive said sphere, said active ball bearings including a drive mechanism capable of moving said active drive sphere in any direction.

2. The omni directional mobility device according to claim 1, wherein said sphere is formed of a material selected from the group consisting essentially of synthetic material, metal, stainless steel, rubber, plastic, glass, ceramics, and combinations thereof.

3. The omni directional mobility device according to claim 1, wherein said sphere includes a coating.

4. The omni directional mobility device according to claim 3, wherein said coating is formed of a resin.

5. The omni directional mobility device according to claim 1, said device further including a steering mechanism.

6. The omni directional mobility device according to claim 5, further including a motor for actuating said drive mechanism.

7. The omni directional mobility device according to claim 6, wherein said motor includes reduction gears.

8. An omni directional vehicle comprising a body and at least one omni directional mobility device as set forth in claim 1.

9. The omni directional vehicle according to claim 8, wherein said sphere is formed of a material selected from the group consisting essentially, of synthetic material, metal, stainless steel, rubber, plastic, glass, ceramics, and combinations thereof.

10. The omni directional vehicle according to claim 8, wherein said sphere includes a coating.

11. The omni directional vehicle according to claim 10, wherein said coating is formed of a resin.

12. The omni directional vehicle according to claim 8, said device further including a steering mechanism.

13. The omni directional vehicle according to claim 12, further including a motor for operating said drive mechanism.

14. The omni directional vehicle according to claim 8 selected from the group consisting essentially of motor operated vehicles, bicycles, wheelchairs, recreational vehicles, forklifts, electrical transportation units, automobiles, carts, wheelchairs, chairs, and trailers.

15. A wheelchair comprising a body and at least one omni directional mobility device as set forth in claim 1.

16. A forklift comprising a body and at least one omni directional mobility device as set-forth in claim 1.

17. An automobile comprising a body and at least one omni directional mobility device as set forth in claim 1.

* * * * *